(12) United States Patent
Kurihara

(10) Patent No.: US 12,715,499 B2
(45) Date of Patent: Aug. 25, 2026

(54) CONTROL UNIT AND STEERING DEVICE

(71) Applicant: Hitachi Astemo, Ltd., Hitachinaka (JP)

(72) Inventor: Hiroaki Kurihara, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 22 days.

(21) Appl. No.: 18/842,636

(22) PCT Filed: Jun. 30, 2022

(86) PCT No.: PCT/JP2022/026379

§ 371 (c)(1),
(2) Date: Aug. 29, 2024

(87) PCT Pub. No.: WO2024/004169

PCT Pub. Date: Jan. 4, 2024

(65) Prior Publication Data

US 2025/0171076 A1 May 29, 2025

(51) Int. Cl.
*B62D 5/04* (2006.01)
*B62D 5/00* (2006.01)

(52) U.S. Cl.
CPC .......... *B62D 5/0484* (2013.01); *B62D 5/003* (2013.01)

(58) Field of Classification Search
CPC ......... B62D 5/0484; B62D 5/003; B62D 5/04
See application file for complete search history.

(56) References Cited

U.S. PATENT DOCUMENTS

| | | | | |
|---|---|---|---|---|
| 11,046,330 B1 * | 6/2021 | Katzourakis | .......... | B60W 10/20 |
| 2003/0200018 A1 * | 10/2003 | Arimura | .............. | B62D 5/0484 180/443 |
| 2018/0370540 A1 * | 12/2018 | Yousuf | .................. | B60W 10/04 |

FOREIGN PATENT DOCUMENTS

| | | |
|---|---|---|
| JP | 2013255330 A | 12/2013 |

OTHER PUBLICATIONS

International Search Report mailed Sep. 6, 2022 for the corresponding PCT International Application No. PCT/JP2022/026379 (2 pages).

* cited by examiner

*Primary Examiner* — Sizo B Vilakazi
(74) *Attorney, Agent, or Firm* — Leason Ellis LLP; Edward J. Ellis; Melvin C. Garner

(57) ABSTRACT

A control unit includes plural control devices configured to control drive of an electric motor. The plural control devices have general functions used for operating the electric motor both during a normal state and during a fault state, the normal state being where the plural control devices is working properly, the fault state being where any one of the plural control devices is having a fault. The plural control devices have normal-time functions distributed among the plural control devices, the normal-time functions being for use during the normal state but unnecessary during the fault state.

13 Claims, 10 Drawing Sheets

CONTROL UNIT AND STEERING DEVICE

CROSS-REFERENCE TO RELATED PATENT APPLICATIONS

This application is a U.S. National Phase Application under 35 U.S.C. § 371 of International Patent Application No. PCT/JP2022/026379 filed on Jun. 30, 2022, the content of which is incorporated herein by reference in its entirety. The International Application was published in Japanese on Jan. 4, 2024 as International Publication No. WO 2024/004169 under PCT Article 21(2).

FIELD OF THE INVENTION

The present invention relates to a control unit and a steering device.

BACKGROUND OF THE INVENTION

Control systems have been proposed that use multiple control devices to drive an electric motor.

For example, an electric motor control system disclosed in Japanese Patent Application Laid-Open Publication No. 2013-255330 uses a main control device and a sub-control device to control the drive of an electric motor equipped with two sets of windings. In the main control device, a d-q axis current command generation unit and a phase velocity generation unit calculate a q-axis current command, a d-axis current command, and a phase velocity based on a torque command input from a host control device. The q-axis current command, the d-axis current command, and the phase velocity are transmitted from the main control device to the sub-control device. Power converters of the main control device and the sub-control device drive the electric motor using the power that has been converted to 3-phase AC power using a value obtained by performing a 2-to-3 phase conversion on a voltage error in their 2-to-3 phase conversion units.

CITATION LIST

Patent Literature

Patent Literature 1: Japanese Patent Application Laid-Open Publication No. 2013-255330

Technical Problem

It is desired to provide multiple control devices to prevent situations where the electric motor cannot be driven at all in the event of a fault occurring in any control device. Control devices are not only expensive but also are valuable products that are difficult to procure, so that their effective utilization is desired.

The present invention has been made under the above circumstances. An object of the present invention is to provide a control unit that allows for an effective utilization of multiple control devices.

SUMMARY OF THE INVENTION

Solution to Problem

With the above object in view, an aspect of the present invention provides a control unit including plural control devices configured to control drive of an electric motor. The plural control devices have general functions used for operating the electric motor both during a normal state and during a fault state, the normal state being where the plural control devices are working properly, the fault state being where any one of the plural control devices is having a fault. The plural control devices have normal-time functions distributed among the plural control devices, the normal-time functions being for use during the normal state but unnecessary during the fault state.

Advantageous Effects of Invention

The present invention can provide a control unit that allows for an effective utilization of multiple control devices.

DETAILED DESCRIPTION OF THE INVENTION

Embodiments of the present invention will be described below in detail with reference to the appended drawings.

First Embodiment

Figure 1:
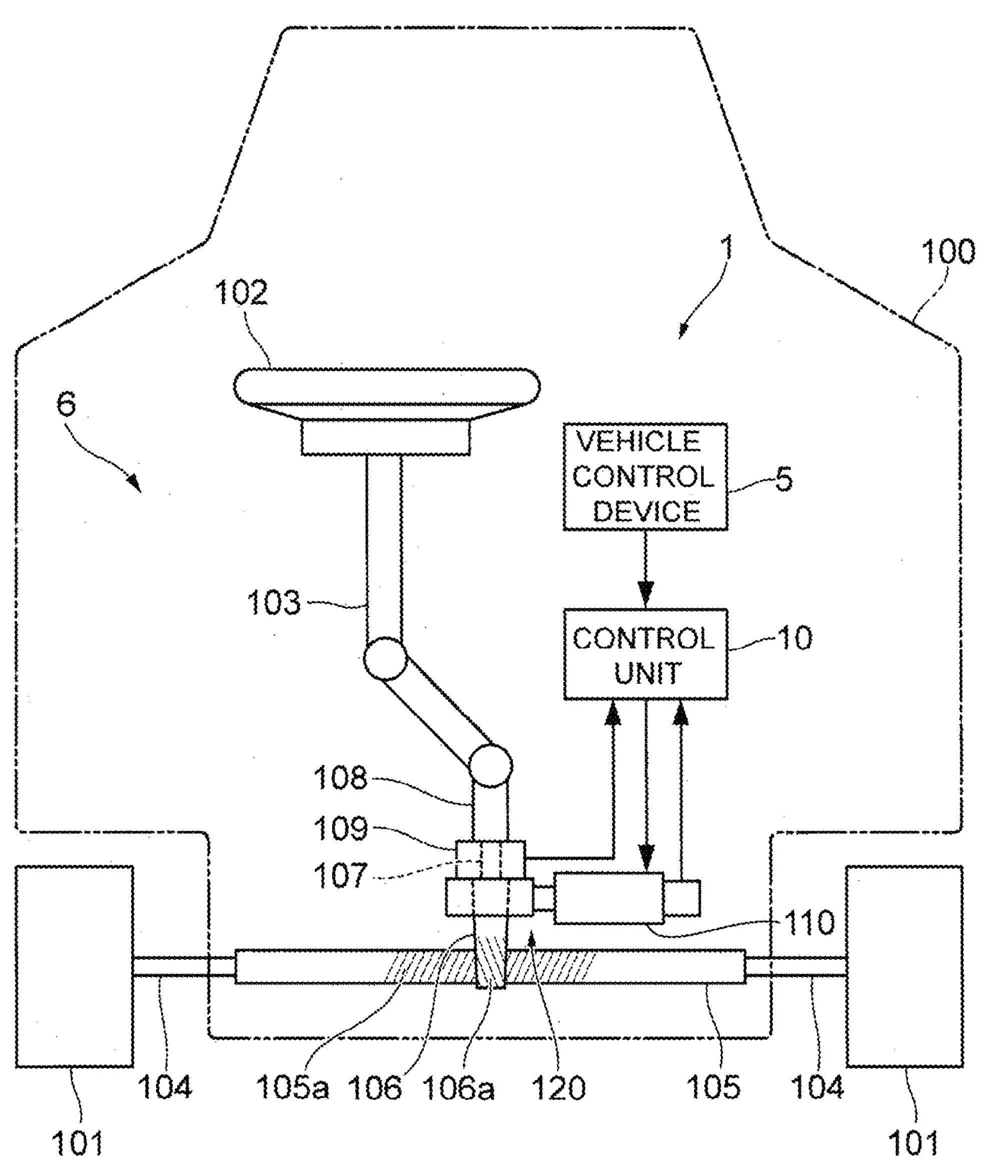
FIG. 1 shows an example of a schematic configuration of a steering system according to a first embodiment.

FIG. 1 illustrates an example of a schematic configuration of a steering system 1 according to a first embodiment.

Figure 2:
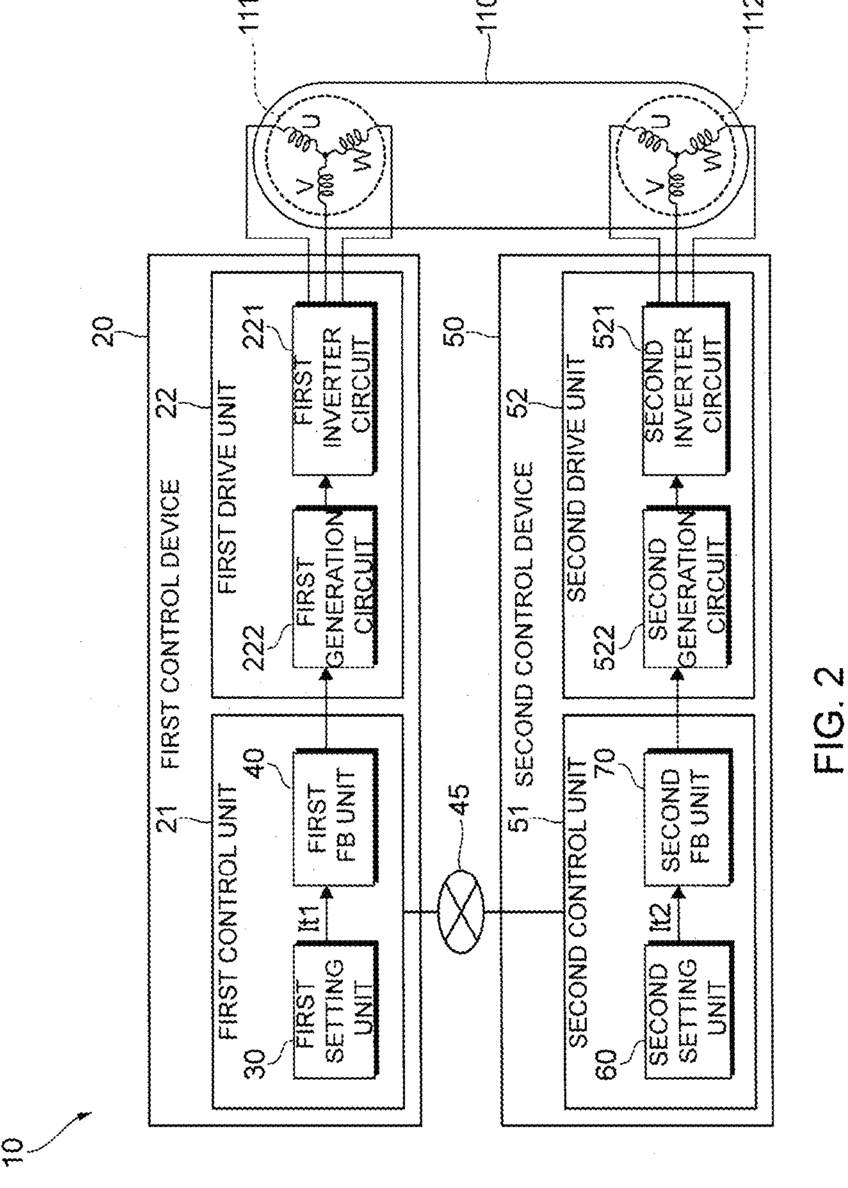
FIG. 2 shows an example of a schematic configuration of a control unit according to the first embodiment.

FIG. 2 illustrates an example of a schematic configuration of a control unit 10 according to the first embodiment.

The steering system 1 includes a vehicle control device 5 installed in a vehicle 100, such as an automobile, to control operations of the vehicle 100, and a steering device 6 to change a traveling direction of the vehicle 100 by causing front wheels 101 of the vehicle 100 to roll. The steering device 6 is an electric power steering device. FIG. 1 is a front view of the vehicle. While FIG. 1 illustrates the power steering device of a pinion assist type, the power steering device may be of a rack-assist type or column-assist type.

The vehicle 100 is equipped with an autonomous driving system and a driving assistance system. The autonomous driving system implements autonomous driving in which the vehicle 100 drives autonomously without requiring any driving operation by a driver (e.g., acceleration, deceleration, and steering operations). The driving assistance system provides driving assistance to assist in the driving of the vehicle 100 with respect to objects in front. Hereafter, the autonomous driving system and the driving assistance system may be referred to collectively as the "autonomous driving system." Example functions of the autonomous driving system include a collision avoidance function to avoid the vehicle 100 from colliding with an object in front, a skid prevention function to prevent the vehicle 100 from skidding, and a parking assistance function to assist the front wheels 101 in rolling when parking the vehicle 100 in a parking lot, etc. Other example functions of the autonomous driving system include a lane keeping assistance function to control the rolling angle of the front wheels 101 to help the vehicle 100 keep the lane and a lane change assistance function to control the rolling angle of the front wheels 101 to help the vehicle 100 change lanes.

For example, the autonomous driving system includes an autonomous steering system, an autonomous braking system, and an autonomous drive system. The autonomous steering system autonomously steers the vehicle 100 without requiring a driver's steering operation. The autonomous braking system applies braking force to the vehicle 100 without requiring a driver's deceleration operation. The autonomous drive system drives the vehicle 100 without requiring a driver's acceleration operation. The steering system 1 functions as an autonomous steering system. The autonomous driving and the driving assistance may be referred to collectively as "autonomous driving." When the vehicle 100 performs the autonomous driving, the steering device 6 performs the autonomous steering.

(Vehicle Control Device 5)

The vehicle control device 5 includes arithmetic logic circuitry consisting of a CPU (not shown), a ROM (not shown), a RAM (not shown), etc. Connected to the vehicle control device 5 is an external information detection unit (not shown) to detect external information for the vehicle 100. The external information detection unit constitutes an object position measuring device that measures positions of objects around the vehicle 100. Examples of the external information detection unit include digital cameras and radars such as laser radars, infrared radars, and millimeter-wave radars. The external information detection unit may also be, for example, an ultrasonic sensor, an infrared sensor, or the like.

The vehicle control device 5 identifies the surrounding conditions of the vehicle 100 based on the information obtained from the external information detection unit and the like, and determines command values, such as the traveling speed of the vehicle 100, for implementing the autonomous driving or driving assistance. The vehicle control device 5 then transmits the command values for implementing the autonomous driving or driving assistance to a control unit 10 (described below) of the steering device 6, a control device of the autonomous braking system, a control device of the autonomous drive system, and the like. In this way, the vehicle control device 5 implements autonomous driving control or driving assistance control.

(Steering Device 6)

The steering device 6 includes a steering wheel 102 operated by the driver to change the traveling direction of the vehicle 100, and a steering shaft 103 integral to the steering wheel 102.

The steering device 6 includes tie rods 104 coupled to the right and left front wheels 101, and a rack shaft 105 coupled to the tie rods 104. The steering device 6 further includes a pinion **106*a* that constitutes a rack and pinion mechanism with rack teeth 105*a* formed on the rack shaft 105. A pinion shaft 106 with the pinion 106*a* is coupled to an interlocking shaft 108 via a torsion bar 107. The interlocking shaft 108 is coupled to the steering shaft 103 via a universal joint or the like and rotates in conjunction with the rotation of the steering wheel 102**.

The steering device 6 includes a torque sensor 109 to detect steering torque T applied to the steering wheel 102 based on a torsion amount of the torsion bar 107. The steering device 6 further includes an electric motor 110 supported by a steering gearbox (not shown) containing the torque sensor 109, and a reducer mechanism 120 to reduce rotation of the electric motor 110 before transmitting it to the pinion shaft 106.

The electric motor 110 is a double three-phase motor including two winding sets composed of double three-phase windings, i.e., a first winding set 111 and a second winding set 112. A maximum output when only the first winding set 111 is energized and a maximum output when only the second winding set 112 is energized are the same.

The steering device 6 further includes a control unit 10 to control operation of the electric motor 110. The control unit 10 receives output signals from the above torque sensor 109. The control unit 10 also receives measurements including a vehicle speed Vc, which is a traveling speed of the vehicle 100, via a network (which may be referred to hereinafter as "CAN") for communication of signals used to control various devices installed on the vehicle 100.

(Control Unit 10)

The control unit 10 includes a first control device 20 to control the current flowing in the first winding set 111 and a second control device 50 to control the current flowing in the second winding set 112. Each of the first and second control devices 20, 50 is capable of communicating with the vehicle control device 5 via the CAN.

(First Control Device 20)

The first control device 20 includes a first control unit 21 to determine the value of current to be applied to the first winding set 111 and a first drive unit 22 to cause the current of the determined value to be supplied to the first winding set 111.

The first control unit 21 includes arithmetic logic circuitry consisting of a CPU (not shown), a ROM (not shown), a RAM (not shown), etc. The ROM stores a basic program (operation system) to be executed by the CPU, various settings, etc. The CPU executes application programs read from the ROM using the RAM as its work area.

The first control unit 21 includes a first setting unit 30 to set a target current It1 to be supplied to the first winding set 111. The first setting unit 30 will be detailed below.

The first control unit 21 also includes a first feedback (which may be abbreviated hereinafter as "FB") unit 40 to perform a feedback control such that the deviation between the target current It1 set by the first setting unit 30 and the current actually flowing in the first winding set 111 is zero.

The first drive unit 22 includes a first inverter circuit 221 to supply a power supply voltage from a battery (not shown) provided in the automobile to the first winding set 111, and a first generation circuit 222 to generate PWM signals for controlling the drive of the first inverter circuit 221 based on drive command signals from the first control unit 21 and output the generated PWM signals.

(Second Control Device 50)

The second control device 50 includes a second control unit 51 to determine the value of current to be applied to the second winding set 112 and a second drive unit 52 to cause the current of the determined value to be supplied to the second winding set 112.

The second control unit 51 includes arithmetic logic circuitry consisting of a CPU (not shown), a ROM (not shown), a RAM (not shown), etc. The ROM stores a basic program (operation system) to be executed by the CPU, various settings, etc. The CPU executes application programs read from the ROM using the RAM as its work area.

The second and first control units 51, 21 can communicate with each other via a network 45. The network 45 may be any communication network used for data communication between control units, and may be either or both wired and wireless. Examples of wireless networks include a Bluetooth® network.

The second control unit 51 includes a second setting unit 60 to set a target current It2 to be supplied to the second winding set 112. The second setting unit 60 will be detailed below.

The second control unit 51 also includes a second FB unit 70 to perform a feedback control such that the deviation between the target current It2 set by the second setting unit 60 and the current actually flowing in the second winding set 112 is zero.

The second drive unit 52 includes a second inverter circuit 521 to supply a power supply voltage from the battery (not shown) to the second winding set 112, and a second generation circuit 522 to generate PWM signals for controlling the drive of the second inverter circuit 521 based on drive command signals from the second control unit 51 and output the generated PWM signals.

{First and Second Setting Units 30, 60}

Figure 3:
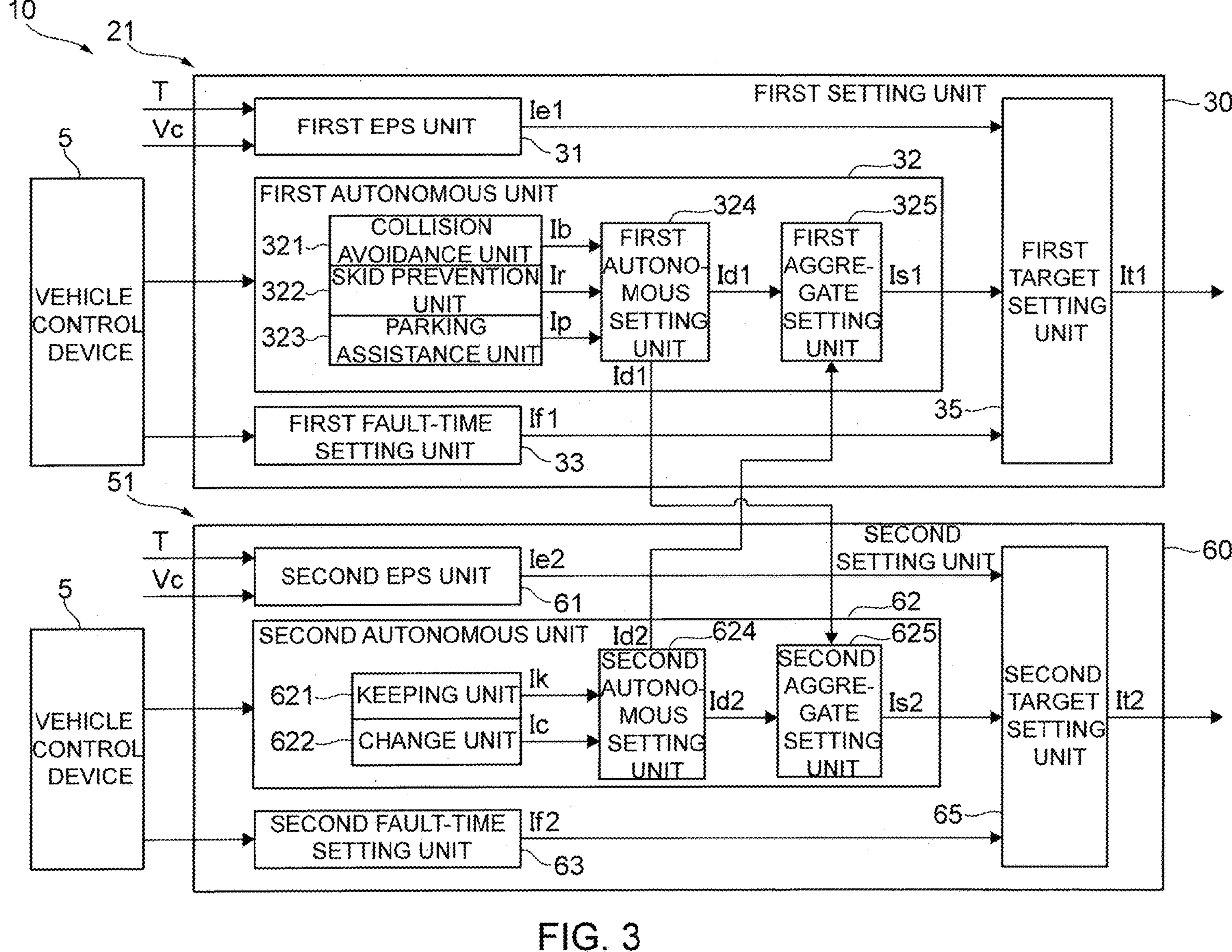
FIG. 3 shows an example of a schematic configurations of first and second setting units.

FIG. 3 illustrates example of a schematic configurations of the first and second setting units 30, 60.

The first setting unit 30 of the first control unit 21 and the second setting unit 60 of the second control unit 51 are now described below.

(First Setting Unit 30)

The first setting unit 30 includes a first EPS unit 31 to set a target current Ie1 using steering torque T detected by the torque sensor 109. The first EPS unit 31 sets the target current Ie1 that is used to cause the electric motor 110 to generate the torque for assisting the driver in steering the steering wheel 102.

By way of example, the first EPS unit 31 sets the target current Ie1 by having the CPU read and execute programs, various settings, etc. stored in the ROM for implementing functions to assist the driver's steering.

The first EPS unit 31 sets the target current Ie1 using the steering torque T and the vehicle speed Vc. By way of example, the first EPS unit 31 sets the target current Ie1 positive when the steering torque T is positive, and sets the target current Ie1 negative when the steering torque T is negative. Also by way of example, at the same vehicle speed Vc, the first EPS unit 31 sets a larger absolute value of the target current Ie1 with increase in the absolute value of the steering torque T, and at the same absolute value of the steering torque T, the first EPS unit 31 sets a larger absolute value of the target current Ie1 with decrease in the vehicle speed Vc.

The first setting unit 30 further includes a first autonomous unit 32 to set a target current Is1 that is used when the steering device 6 performs autonomous steering. The first autonomous unit 32 sets the target current Is1 based on information transmitted from other systems such as the vehicle control device 5.

The first autonomous unit 32 includes a collision avoidance unit 321 to set a target current Ib that is used for avoiding a collision, a skid prevention unit 322 to set a target current Ir that is used for preventing the vehicle 100 from skidding, and a parking assistance unit 323 to set a target current Ip that is used for assisting the front wheels 101 in rolling when parking the vehicle 100 in a parking lot, etc.

The collision avoidance unit 321 sets the target current Ib by having the CPU read and execute programs, various settings, etc. stored in the ROM for implementing the collision avoidance function.

The skid prevention unit 322 sets the target current Ir by having the CPU read and execute programs, various settings, etc. stored in the ROM for implementing the skid prevention function.

The parking assistance unit 323 sets the target current Ip by having the CPU read and execute programs, various settings, etc. stored in the ROM for implementing for the parking assistance function.

The first autonomous unit 32 also includes a first autonomous setting unit 324 to output a target current Id1 (=Ib+Ir+Ip) obtained by adding the target current Ib set by the collision avoidance unit 321, the target current Ir set by the skid prevention unit 322, and the target current Ip set by the parking assistance unit 323.

The first setting unit 30 also includes a first aggregate setting unit 325 to output a target current Is1 (=Id1+Id2) obtained by adding the target current Id1 output from the first autonomous setting unit 324 and a target current Id2 output from a second autonomous setting unit 624 (described below).

The first setting unit 30 further includes a first fault-time setting unit 33 to set a target current If1 that is used for rolling the front wheels 101 in the event of a fault occurring in the second control unit 51.

In an autonomous steering system, even in the event of a fault occurring during the execution of autonomous steering performed in association with the autonomous driving control or driving assistance control of the vehicle 100, the minimum operation needs to be continued until the driver resumes steering or the vehicle 100 is stopped. The minimum operation may include, for example, corrective control of the rolling angle of the front wheels 101. For example, if a fault occurs in the second control unit 51 while the autonomous steering control is active and the vehicle 100 is turning a corner, the rolling angle of the front wheels 101 needs to be controlled to an appropriate angle (e.g., an angle that keeps the vehicle 100 from departing from its lane) until the vehicle 100 finishes turning the corner. The first fault-time setting unit 33 sets the target current If1 used for performing corrective control of the rolling angle of the front wheels 101 until, for example, the vehicle 100 finishes turning the corner.

The first fault-time setting unit 33 sets the target current If1 by having the CPU read programs, various settings, etc. for executing the predetermined minimum operation.

The first setting unit 30 further includes a first target setting unit 35 to set the target current It1 using the target current Ie1 set by the first EPS unit 31, the target current Is1 set by the first autonomous unit 32, and the target current If1 set by the first fault-time setting unit 33. For example, the first target setting unit 35 sets the value obtained by adding the target currents Ie1, Is1, If1 as the target current It1 (It1=Ie1+Is1+If1).

(Second Setting Unit 60)

The second setting unit 60 includes a second EPS unit 61 to set a target current Ie2 using the steering torque T detected by the torque sensor 109. The second EPS unit 61 sets the target current Ie2 that is used to cause the electric motor 110 to generate the torque for assisting the driver in steering the steering wheel 102. The second EPS unit 61 is similar to the first EPS unit 31, so a detailed description thereof is omitted.

The second setting unit 60 includes a second autonomous unit 62 to set a target current Is2 that is used when the steering device 6 performs autonomous steering. The second autonomous unit 62 sets the target current Is2 based on information transmitted from other systems such as the vehicle control device 5.

The second autonomous unit 62 includes a keeping unit 621 to set a target current Ik that is used when controlling the rolling angle of the front wheels 101 to help the vehicle 100 keep its lane, and a change unit 622 to set a target current Ic that is used when controlling the rolling angle of the front wheels 101 to help the vehicle 100 change lanes.

The keeping unit 621 sets the target current Ik by having the CPU read and execute programs, various settings, etc. stored in the ROM for implementing the lane keeping assistance function.

The change unit 622 sets the target current Ic by having the CPU read and execute programs, various settings, etc. stored in the ROM for implementing the lane change assistance function.

The second autonomous unit 62 also includes a second autonomous setting unit 624 to output a target current Id2 (=Ik+Ic) obtained by adding the target current Ik set by the keeping unit 621 and the target current Ic set by the change unit 622.

The second autonomous unit 62 also includes a second aggregate setting unit 625 to output a target current Is2 (=Id2+Id1) obtained by adding the target current Id2 output from the second autonomous setting unit 624 and the target current Id1 output from the first autonomous setting unit 324 in the first setting unit 30.

The second setting unit 60 further includes a second fault-time setting unit 63 to set a target current If2 that is used for providing steering assistance in the event of a fault occurring in the first control unit 21. The second fault-time setting unit 63 is similar to the first fault-time setting unit 33, so a detailed description thereof is omitted.

The second setting unit 60 further includes a second target setting unit 65 to set a target current It2 using the target current Ie2 set by the second EPS unit 61, the target current Is2 set by the second autonomous unit 62, and the target current If2 set by the second fault-time setting unit 63. For example, the second target setting unit 65 sets the value obtained by adding the target currents Ie2, Is2, If2 as the target current It2 (It2=Ie2+Is2+If2).

Hereinafter, the drive control of the electric motor 110 performed by the first control device 20 by setting the target current Ie1 in the first EPS unit 31 and supplying a current corresponding to the target current Ie1 to the first winding set 111 due to the target current Ie1 being set may be referred to as "first EPS control."

The drive control of the electric motor 110 performed by the first control device 20 by setting the target current Id1 in the first autonomous setting unit 324 and supplying a current corresponding to the target current Id1 to the first winding set 111 due to the target current Id1 being set may be referred to as "first autonomous steering control."

The drive control of the electric motor 110 performed by the first control device 20 by adding the target current Id2, received from the second autonomous setting unit 624, in the first aggregate setting unit 325 and supplying a current corresponding to the target current Id2 to the first winding set 111 due to the addition of the target current Id2 may be referred to as "second autonomous steering control."

The drive control of the electric motor 110 performed by the first control device 20 by setting the target current If1 in the first fault-time setting unit 33 and supplying a current corresponding to the target current If1 to the first winding set 111 due to the target current If1 being set may be referred to as "first fault-time control."

The drive control of the electric motor 110 performed by the second control device 50 by setting the target current Ie2 in the second EPS unit 61 and supplying a current corresponding to the target current Ie2 to the second winding set 112 due to the target current Ie2 being set may be referred to as "second EPS control." The target current Ie1 and the target current Ie2 are the same, so the driving force for the electric motor 110 provided by the first EPS control and the driving force for the electric motor 110 provided by the second EPS control are the same. Hereinafter, the first EPS control and the second EPS control may be referred to collectively as "EPS control" unless the distinction is needed.

The drive control of the electric motor 110 performed by the second control device 50 by setting the target current Id2 in the second autonomous setting unit 624 and supplying a current corresponding to the target current Id2 to the second winding set 112 due to the target current Id2 being set may be referred to as "second autonomous steering control." In other words, the second autonomous steering control is either the drive control of the electric motor 110 performed by the second control device 50 by supplying a current corresponding to the target current Id2 to the second winding set 112 or the drive control of the electric motor 110 performed by the first control device 20 by supplying a current corresponding to the target current Id2 to the first winding set 111. In either case, the second autonomous steering control is performed using the target current Id2 set by the second control device 50. Thus, the second autonomous steering control can be viewed as a function executed by the second control device 50.

The drive control of the electric motor 110 performed by the second control device 50 by adding the target current Id1, received from the first autonomous setting unit 324, in the second aggregate setting unit 625 and supplying a current corresponding to the target current Id1 to the second winding set 112 due to the addition of the target current Id1 may be referred to as "first autonomous steering control." In other words, the first autonomous steering control is either the drive control of the electric motor 110 performed by the second control device 50 by supplying a current corresponding to the target current Id1 to the second winding set 112 or the drive control of the electric motor 110 performed by the first control device 20 by supplying a current corresponding to the target current Id1 to the first winding set 111. In either case, the first autonomous steering control is performed using the target current Id1 set by the first control device 20. Thus, the first autonomous steering control can be viewed as a function executed by the first control device 20.

The drive control of the electric motor 110 performed by the second control device 50 by setting the target current If2 in the second fault-time setting unit 63 and supplying a current corresponding to the target current If2 to the second winding set 112 due to the target current If2 being set may be referred to as "second fault-time control." The target current If1 and the target current If2 are the same, so the driving force for the electric motor 110 provided by the first fault-time control and the driving force for the electric motor 110 provided by the second fault-time control are the same. Hereinafter, the first fault-time control and the second fault-time control may be referred to collectively as "fault-time control" unless the distinction is needed.

(Operations of the Steering System 1)

Figure 4:
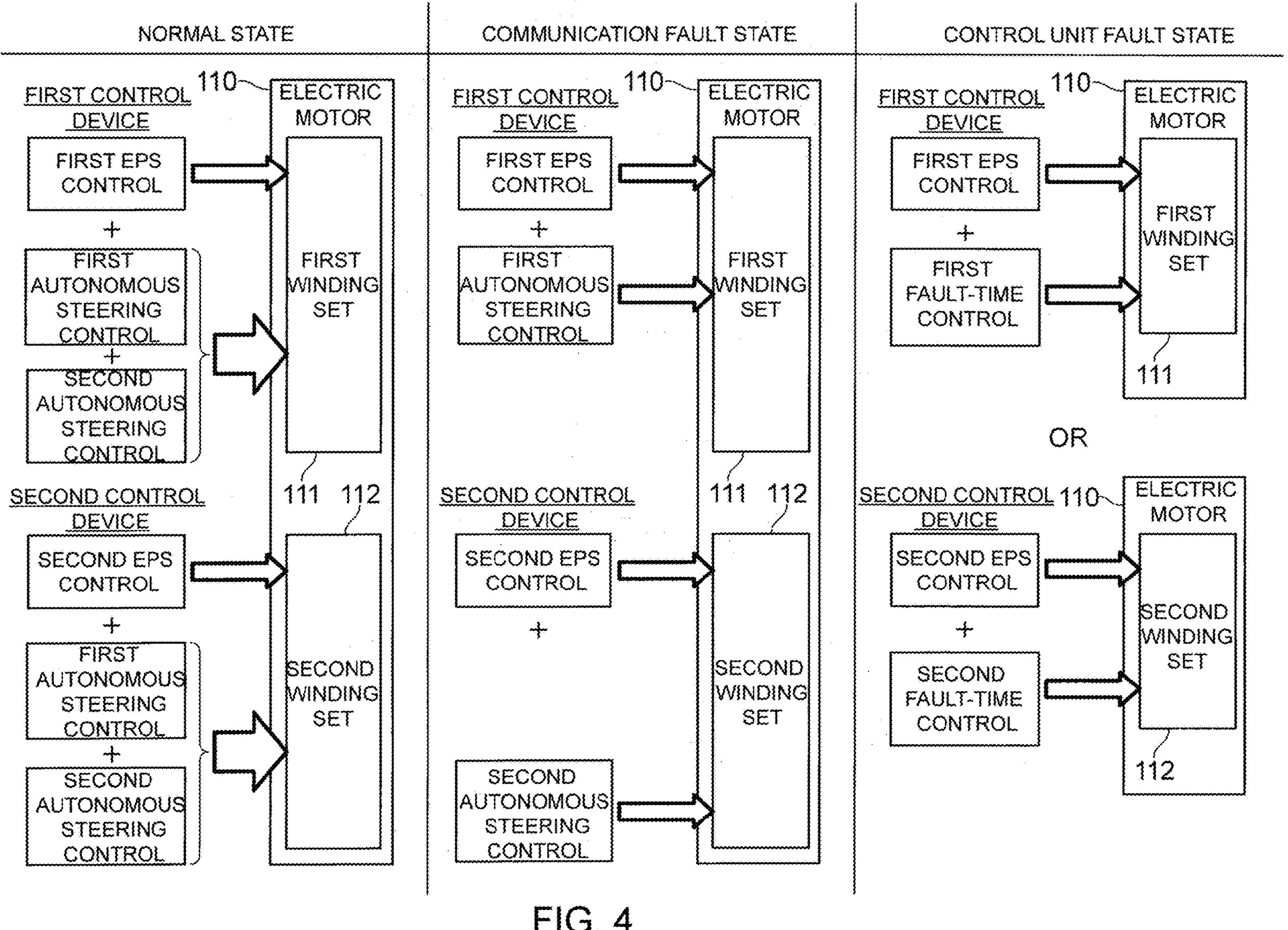
FIG. 4 explains operations of a steering device.

FIG. 4 illustrates operations of the steering device 6.

Hereinafter, a situation where a communication fault is occurring between the first and second control units 21, 51 is referred to as being in a “communication fault state,” a situation where a fault is occurring in the first control unit 21 or the second control unit 51 is referred to as being in a “control unit fault state,” and a situation that is neither in the communication fault state nor in the control unit fault state is referred to as being in a “normal state.”

<<Normal State>>

During the normal state, the first and second control devices 20, 50 of the steering device 6 each execute the EPS control, first autonomous steering control, and second autonomous steering control. In other words, the first setting unit 30 of the first control unit 21 sets the target current It1 (=Ie1+Id1+Id2) by adding the target current Ie1 set by the first EPS unit 31, the target current Id1 set by the first autonomous setting unit 324, and the target current Id2 set by the second autonomous setting unit 624. Also, the second setting unit 60 of the second control unit 51 sets the target current It2 (=Ie2+Id2+Id1) by adding the target current Ie2 set by the second EPS unit 61, the target current Id2 set by the second autonomous setting unit 624, and the target current Id1 set by the first autonomous setting unit 324. The target current Ie1 set by the first EPS unit 31 and the target current Ie2 set by the second EPS unit 61 are the same, so the target current It1 set by the first setting unit 30 of the first control unit 21 and the target current It2 set by the second setting unit 60 of the second control unit 51 have the same value.

The first and second fault-time setting units 33, 63 do not set the target currents If1, If2, respectively, because there is no fault occurring in the first and second control units 21, 51.

As a result, during the normal state, the front wheels 101 are caused to roll by the driving force that is the sum of the driving force resulting from a current being supplied to the first winding set 111 and the driving force resulting from a current being supplied to the second winding set 112, which are based on the target currents of the same value.

<<Communication Fault State>>

When there is no communication fault occurring between the first and second control units 21, 51, the first setting unit 30 of the first control unit 21 can receive the target current Id2 output from the second autonomous setting unit 624 of the second control unit 51, and the second setting unit 60 of the second control unit 51 can receive the target current Id1 output from the first autonomous setting unit 324 of the first control unit 21. On the other hand, during a communication fault state, the first setting unit 30 of the first control unit 21 cannot receive the target current Id2 output from the second autonomous setting unit 624 of the second control unit 51, and the second setting unit 60 of the second control unit 51 cannot receive the target current Id1 output from the first autonomous setting unit 324 of the first control unit 21.

Hence, the first control device 20 executes the EPS control and the first autonomous steering control, and the second control device 50 executes the EPS control and the second autonomous steering control. In other words, the first setting unit 30 of the first control unit 21 sets the target current It1 (=Ie1+Id1) by adding the target current Ie1 set by the first EPS unit 31 and the target current Id1 set by the first autonomous setting unit 324. The second setting unit 60 of the second control unit 51 sets the target current It2 (=Ie2+Id2) by adding the target current Ie2 set by the second EPS unit 61 and the target current Id2 set by the second autonomous setting unit 624.

As such, during a communication fault state, the first setting unit 30 does not receive the target current Id2 from the second setting unit 60 of the second control unit 51 and thus sets the target current It1 (=Ie1+Id1) by adding the target current Ie1 and the target current Id1. The second setting unit 60 does not receive the target current Id1 from the first setting unit 30 of the first control unit 21 and thus sets the target current It2 (=Ie2+Id2) by adding the target current Ie2 and the target current Id2.

As a result, during a communication fault state, the front wheels 101 are caused to roll by the driving force that is the sum of the driving force resulting from a current being supplied to the first winding set 111 and the driving force resulting from a current being supplied to the second winding set 112, and the value of current supplied to the first and second winding sets 111, 112 is not greater than that during the normal state. However, even during a communication fault state, the EPS control provides the same value of current as that during the normal state.

<<Control Unit Fault State>>

Each of the first and second control units 21, 51 has a function to diagnose whether it is working properly. When not working properly, each of the first and second control units 21, 51 transmits information to that effect to the vehicle control device 5. In response to receiving information from one of the first and second control units 21, 51 indicating that it is not working properly, the vehicle control device 5 transmits information to the other of the control units indicating that the one of the control units is not working properly. This allows the other of the control units to know that a control unit fault state is occurring in which the one of the control units is having a fault. For example, in response to receiving information from the second control unit 51 indicating that it is not working properly, the vehicle control device 5 transmits information to the first control unit 21 indicating that the second control unit 51 is not working properly. This allows the first control unit 21 to know that a control unit fault state is occurring in which the second control unit 51 is having a fault.

During a control unit fault state in which the second control unit 51 is not working properly, and in response to receiving information to that effect, the first control unit 21 does not have the first autonomous unit 32 set the target current Is1. In other words, the collision avoidance unit 321, the skid prevention unit 322, and the parking assistance unit 323 do not set the target currents Ib, the target current Ir, and the target current Ip, respectively. Also, the first autonomous setting unit 324 and the first aggregate setting unit 325 do not output the target current Id1 and the target current Is1, respectively. However, an alternative implementation is possible where, during a control unit fault state in which the second control unit 51 is not working properly, and in response to receiving information to that effect, the collision avoidance unit 321, the skid prevention unit 322, and the parking assistance unit 323 set the target current Ib, the target current Ir, and the target current Ip, respectively, but the first autonomous setting unit 324 does not output the target current Id1 or outputs zero as the target current Id1. When the second control unit 51 is not working properly, the first aggregate setting unit 325 does not receive the target current Id2, and thus does not output the target current Is1 or outputs zero as the target current Is1.

During the control unit fault state in which the second control unit 51 is not working properly, the first control unit 21 has the first EPS unit 31 set the target current Ie1 and has the first fault-time setting unit 33 set the target current If1.

The first target setting unit 35 then sets the value obtained by adding the target current Ie1 set by the first EPS unit 31 and the target current If1 set by the first fault-time setting unit 33 as the target current It1 (=Ie1+If1).

In this manner, in the event of a fault occurring in the second control unit 51, the first control device 20 performs the EPS control and fault-time control, without performing the autonomous steering control.

On the other hand, during a control unit fault state in which the first control unit 21 is not working properly, and in response to receiving information to that effect, the second control unit 51 does not have the second autonomous unit 62 set the target current Is2. In other words, the keeping unit 621 and the change unit 622 do not set the target current Ik and the target current Ic, respectively. Also, the second autonomous setting unit 624 and the second aggregate setting unit 625 do not output the target current Id2 and the target current Is2, respectively. However, an alternative implementation is possible where, during a control unit fault state in which the first control unit 21 is not working properly, and in response to receiving information to that effect, the keeping unit 621 and the change unit 622 set the target current Ik and the target current Ic, respectively, but the second autonomous setting unit 624 does not output the target current Id2 or outputs zero as the target current Id2. When the first control unit 21 is not working properly, the second aggregate setting unit 625 does not receive the target current Id1, and thus does not output the target current Is2 or outputs zero as the target current Is2.

During the control unit fault state in which the first control unit 21 is not working properly, the second control unit 51 has the second EPS unit 61 set the target current Ie2 and has the second fault-time setting unit 63 set the target current If2.

The second target setting unit 65 then sets the value obtained by adding the target current Ie2 set by the second EPS unit 61 and the target current If2 set by the second fault-time setting unit 63 as the target current It2 (=Ie2+If2).

In this manner, in the event of a fault occurring in the first control unit 21, the second control device 50 performs the EPS control and fault-time control, without performing the autonomous steering control.

In response to receiving information from one of the first and second control units 21, 51 indicating that it is not working properly, the vehicle control device 5 informs the driver that the autonomous steering control cannot be executed. The manner of informing the driver is not limited. By way of example, the vehicle control device 5 may present a message on an instrument panel of the vehicle 100 or a display of a navigation system indicating that the autonomous steering control cannot be executed due to the occurrence of the fault.

As described above, the steering system 1 is configured such that both the first and second control devices 20, 50 can perform the same EPS control to ensure that the control unit 10 can perform the EPS control even in the event of a fault occurring in one of the first and second control units 21, 51. This provides redundancy.

Regarding, on the other hand, the autonomous steering control, which is not required to be still performed in the event of a fault occurring in one of the first and second control units 21, 51, the steering system 1 is not configured such that both the first and second control devices 20, 50 can perform the same autonomous steering control, so that redundancy is not provided for the autonomous steering control. The thus configured steering system 1 benefits from the following advantages.

For example, in one contemplated implementation, the first and second control devices 20, 50 may be configured such that they can perform the same autonomous steering control in case a fault occurs in one of the control devices, thereby providing redundancy.

Figure 5:
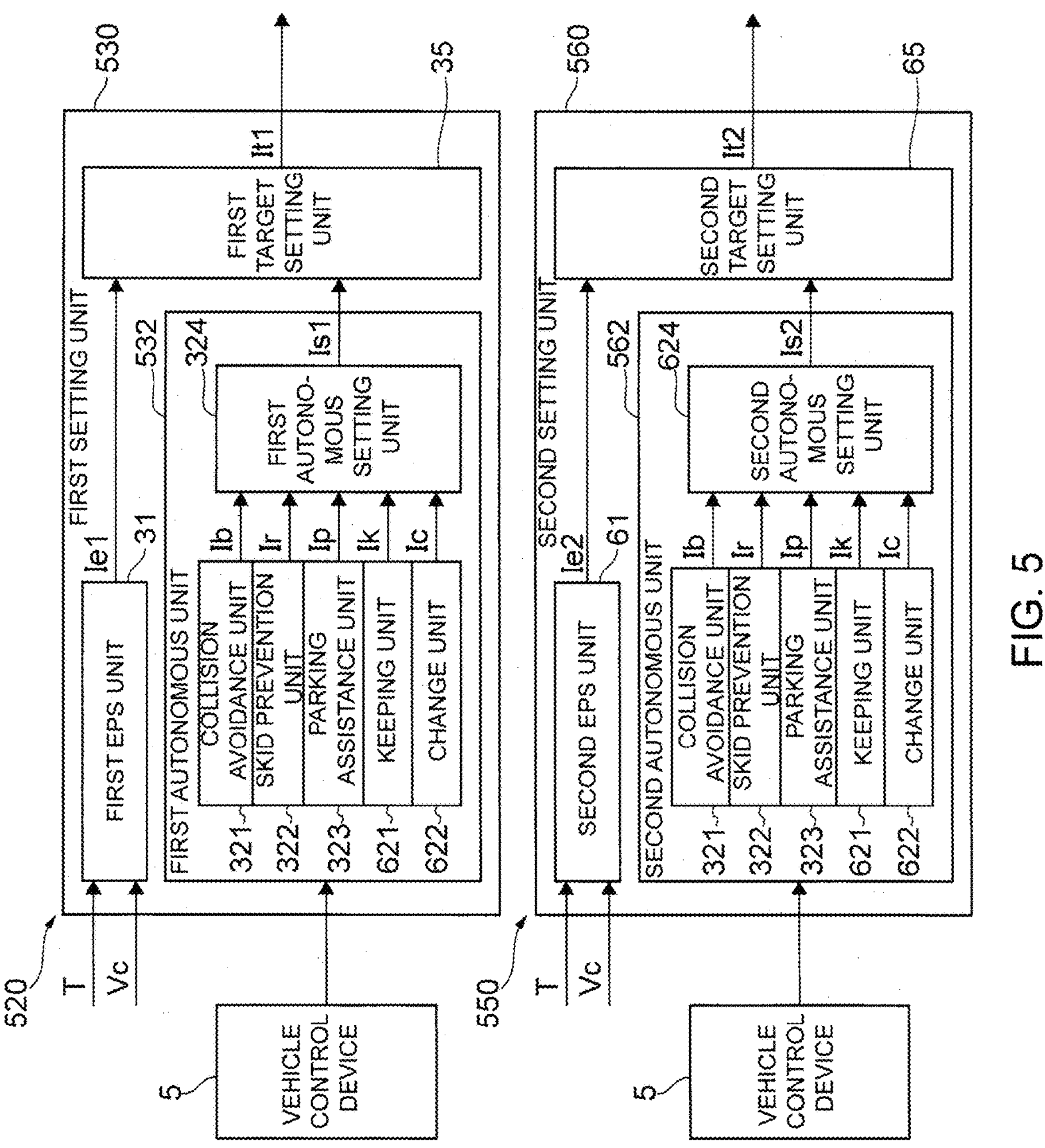
FIG. 5 shows an example of a block diagram of first and second control devices according to a comparative example.

FIG. 5 is an example of a block diagram of a first and second control devices 520, 550 according to a comparative example.

Distinctions of the first and second control devices 520, 550 according to the comparative example from the first and second control devices 20, 50 according to the first embodiment relate to a first setting unit 530 and a second setting unit 560, which correspond to the first setting unit 30 and the second setting unit 60, respectively. The distinctions from the first and second control devices 20, 50 according to the first embodiment are described below. Components with similar structures and functions between the first and second control devices 20, 50 according to the first embodiment and the first and second control devices 520, 550 according to the comparative example are identified by the same reference numerals, and detailed descriptions thereof are omitted.

A distinction of the first setting unit 530 according to the comparative example from the first setting unit 30 according to the first embodiment relates to a first autonomous unit 532, which corresponds to the first autonomous unit 32. In another distinction from the first setting unit 30, the first setting unit 530 does not include the first fault-time setting unit 33. In other words, the first setting unit 530 according to the comparative example includes the first EPS unit 31 and the first autonomous unit 532.

The first autonomous unit 532 has the functions provided by the first autonomous unit 32 and the second autonomous unit 62 of the second control device 50 according to the first embodiment. For example, the first autonomous unit 532 includes the collision avoidance unit 321, the skid prevention unit 322, and the parking assistance unit 323 of the first autonomous unit 32 and the keeping unit 621 and the change unit 622 of the second autonomous unit 62. The first autonomous setting unit 324 outputs the target current Is1 (=Ib+Ir+Ip+Ik+Ic) obtained by adding the target current Ib set by the collision avoidance unit 321, the target current Ir set by the skid prevention unit 322, the target current Ip set by the parking assistance unit 323, the target current Ik set by the keeping unit 621, and the target current Ic set by the change unit 622.

A distinction of the second setting unit 560 according to the comparative example from the second setting unit 60 according to the first embodiment relates to a second autonomous unit 562, which corresponds to the second autonomous unit 62. In another distinction from the second setting unit 60, the second setting unit 560 does not include the second fault-time setting unit 63. In other words, the second setting unit 560 according to the comparative example includes the second EPS unit 61 and the second autonomous unit 562.

The second autonomous unit 562 has the functions provided by the second autonomous unit 62 and the first autonomous unit 32 of the first control device 20 according to the first embodiment. For example, the second autonomous unit 562 includes the keeping unit 621 and the change unit 622 of the second autonomous unit 62 and the collision avoidance unit 321, the skid prevention unit 322, and the parking assistance unit 323 of the first autonomous unit 32. The second autonomous setting unit 624 outputs the target current Is2 (=Ib+Ir+Ip+Ik+Ic) obtained by adding the target current Ib set by the collision avoidance unit 321, the target current Ir set by the skid prevention unit 322, the target current Ip set by the parking assistance unit 323, the target current Ik set by the keeping unit 621, and the target current Ic set by the change unit 622. In other words, as with the first autonomous unit 532, the second autonomous unit 562 has all the functions provided by the first and second autonomous units 32, 62 according to the first embodiment.

Unlike the first control device 20 according to the first embodiment, the first control device 520 according to the comparative example configured as described above needs to store programs, various settings, etc. in the ROM that are necessary for the keeping unit 621 and the change unit 622 to set the target current Ik and the target current Ic, respectively. Also, unlike the second control device 50 according to the first embodiment, the second control device 550 needs to store programs, various settings, etc. in the ROM that are necessary for the collision avoidance unit 321, the skid prevention unit 322, and the parking assistance unit 323 to set the target current Ib, the target current Ir, and the target current Ip, respectively.

In other words, unlike the first control device 520 according to the comparative example, the first control device 20 according to the first embodiment does not include the keeping unit 621 and the change unit 622, and thus does not need to store programs, various settings, etc. in the ROM that are necessary for setting the target currents Ik, Ic. On the other hand, the amount of programs, various settings, etc. necessary for the first fault-time setting unit 33 to set the target current If1, which the first control device 20 needs to store in the ROM, is less than the amount of programs, various settings, etc. required for setting the target currents Ik, Ic. As a result, the first control device 20 according to the first embodiment may have less storage space for programs etc. than the first control device 520 according to the comparative example. In addition, the load necessary for the keeping unit 621 and the change unit 622 to set the target current Ik and the target current Ic, respectively, is higher than that necessary for the first fault-time setting unit 33 to set the target current If1. As a result, a device with less performance and storage space than the first control device 520 according to the comparative example can be used as the first control device 20 according to the first embodiment, which can reduce the product cost compared to using the first control device 520. When, alternatively, a device with comparable performance and storage space to the first control device 520 according to the comparative example is used as the first control device 20 according to the first embodiment, the first control device 20 can be provided with additional functions necessary for autonomous steering, in addition to the collision avoidance unit 321, the skid prevention unit 322, and the parking assistance unit 323. This allows for an efficient use of valuable resources.

Unlike the second control device 550 according to the comparative example, the second control device 50 according to the first embodiment does not include the collision avoidance unit 321, the skid prevention unit 322, and the parking assistance unit 323, and thus does not need to store programs, various settings, etc. in the ROM that are necessary for setting the target currents Ib, Ir, Ip. On the other hand, the amount of programs, various settings, etc. necessary for the second fault-time setting unit 63 to set the target current If2, which the second control device 50 needs to store in the ROM, is less than the amount of programs, various settings, etc. necessary for setting the target currents Ib, Ir, Ip. As a result, the second control device 50 according to the first embodiment may have less storage space for programs, etc. than the second control device 550 according to the comparative example. In addition, the load necessary for the collision avoidance unit 321, the skid prevention unit 322, and the parking assistance unit 323 to set the target current Ib, the target current Ir, and the target current Ip, respectively, is higher than that necessary for the second fault-time setting unit 63 to set the target current If2. As a result, a device with less performance and storage space than the second control device 550 according to the comparative example can be used as the second control device 50 according to the first embodiment, which can reduce the product cost compared to using the second control device 550. When, alternatively, a device with comparable performance and storage space to the second control device 550 according to the comparative example is used as the second control device 50 according to the first embodiment, the second control device 50 can be provided with additional functions necessary for autonomous steering, in addition to the keeping unit 621 and the change unit 622. This allows for an efficient use of valuable resources.

As described above, the control unit 10 includes the plural control devices (e.g., the first and second control devices 20, 50) configured to control the drive of the electric motor 110, which is an example of the electric motor. The plural control devices have the EPS control function, which is an example of the general functions, used to operate the electric motor 110 both during a normal state in which the plural control devices is working properly and during a fault state in which any one of the plural control devices is having a fault. The plural control devices also have the autonomous steering control functions, which are an example of the normal-time functions, that are distributed among them and used during a normal state but are unnecessary during a fault state. For example, the first control device 20 sets the target current Id1 used for the first autonomous steering control function, and the second control device 50 sets the target current Id2 used for the second autonomous steering control function.

The control unit 10 configured as described above allows for reducing the performance of each of the plural control devices. In addition, the storage space for programs, etc. that each of the plural control devices needs to have can be reduced. As a result, this can reduce the product cost of each of the plural control devices. In addition, the control unit 10 allows for an efficient utilization of valuable resources compared to a configuration where the autonomous steering control functions are not distributed among the plural control devices.

In the first embodiment, the autonomous steering control functions are distributed such that the first setting unit 30 of the first control device 20 includes the collision avoidance unit 321, the skid prevention unit 322, and the parking assistance unit 323, and the second setting unit 60 of the second control device 50 includes the keeping unit 621 and the change unit 622. However, there is no limitation to how many and which types of functions are to be distributed between the first and second setting units 30, 60.

While the plural control devices have been illustrated as consisting of two control devices, i.e., the first control device 20 and the second control device 50, the number of control devices is not limited to two, and the plural control devices may consist of three or more control devices. For example, the electric motor 110 may have three or more winding sets, and three or more control devices may be provided to control the values of current supplied to the respective ones of the three or more winding sets.

In the control unit 10, each of the plural control devices has the fault-time control function, which is an example of the fault-time functions, that are used to operate the electric motor 110 during the occurrence of a fault. This allows the minimum operation, such as corrective control of the rolling angle of the front wheels 101, to continue even in the event of, for example, a fault occurring in one of the control devices.

In the control unit 10, the first control device 20 of the plural control devices sets the target current Id1 as an example of the first control command value for implementing the first autonomous steering control function as an example of the first function included in the normal-time functions. Also, the second control device 50 sets the target current Id2 as an example of the second control command value for implementing the second autonomous steering control function as an example of the second function included in the normal-time functions. The second control device 50 transmits the set target current Id2 to the first control device 20, which in turn controls the drive of the electric motor 110 using the set target current Id1 and the target current Id2 received from the second control device 50. Compared to a configuration where the first control device 20 has the function to set the target current Id2 in addition to the function to set the target current Id1, the above configuration of the control unit 10 can reduce the product cost or provide the first control device 20 with extra capacity to have other functionality than the function to set the target current Id2.

The first control device 20 transmits the set target current Id1 to the second control device 50, which in turn controls the drive of the electric motor 110 using the set target current Id2 and the target current Id1 received from the first control device 20. Compared to a configuration where the second control device 50 has the function to set the target current Id1 in addition to the function to set the target current Id2, the above configuration of the control unit 10 can reduce the product cost or provide the second control device 50 with extra capacity to have other functionality than the function to set the target current Id1. This allows for an efficient utilization of valuable resources.

One of the first and second control devices 20, 50 does not control the drive of the electric motor 110 using the control command value it transmits, which is either the target current Id1 or the target current Id2, when the other of the control devices is having a fault. For example, when the second control device 50 is having a fault, the first control device 20 does not output the target current Id1 or outputs zero. When either the first control device 20 or the second control device 50 fails, the autonomous steering control is not necessarily required. This can reduce the load on the properly working one of the control devices, allowing for an efficient utilization of valuable resources.

However, one of the first and second control devices 20, 50 may control the drive of the electric motor 110 using the control command value it transmits, which is either the target current Id1 or the target current Id2, when the other of the control devices is having a fault. For example, when the second control device 50 is having a fault, the first control device 20 may execute the first autonomous steering control. Also, when the first control device 20 is having a fault, the second control device 50 may execute the second autonomous steering control.

Second Embodiment

Figure 6:
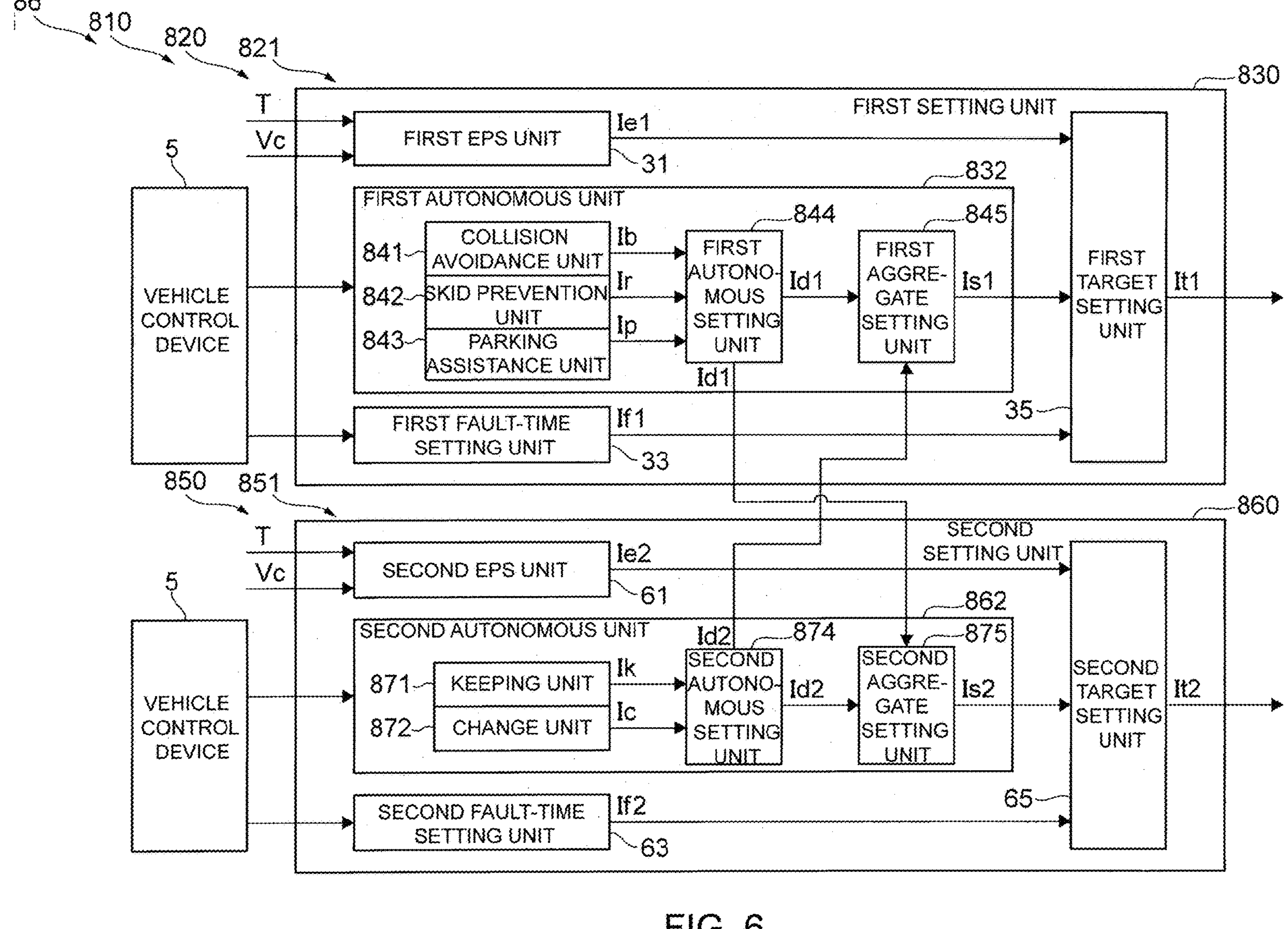
FIG. 6 shows an example of a schematic configuration of a control unit according to a second embodiment.

FIG. 6 illustrates an example of a schematic configuration of a control unit 810 according to a second embodiment.

Figure 7:
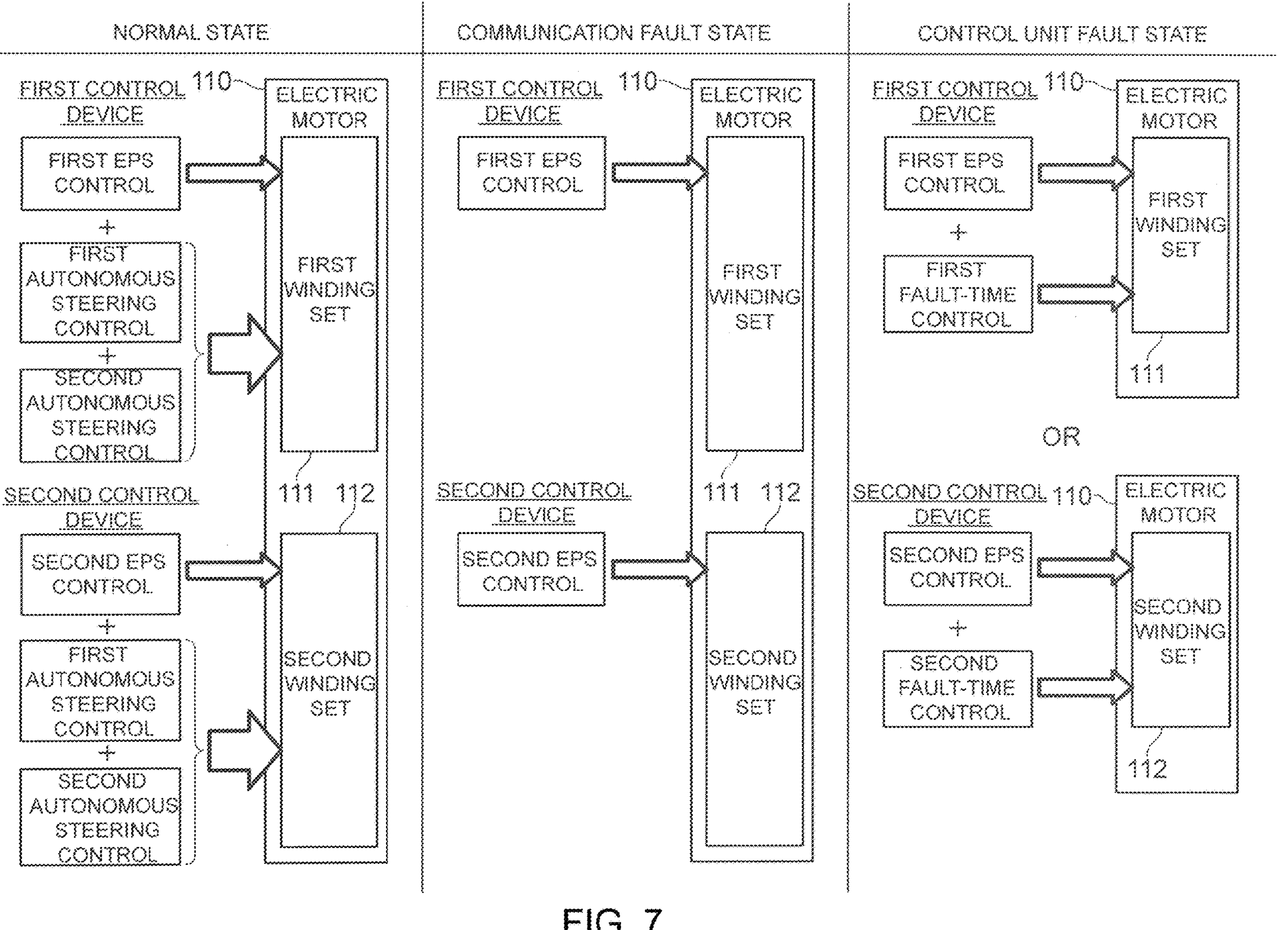
FIG. 7 explains operations of a steering device according to the second embodiment.

FIG. 7 illustrates operations of a steering device 86 according to the second embodiment.

In a distinction from the steering device 6 according to the first embodiment, the steering device 86 according to the second embodiment does not execute the autonomous steering control during a communication fault state, too. The following discusses the distinction from the steering device 6 according to the first embodiment, and components with similar functions to those of the steering device 6 according to the first embodiment are identified with the same reference numerals and detailed descriptions thereof are omitted.

The steering device 86 according to the second embodiment includes a control unit 810, which corresponds to the control unit 10 according to the first embodiment.

The control unit 810 includes a first control device 820 and a second control device 850, which correspond to the first control device 20 and the second control device 50, respectively, according to the first embodiment.

The first control device 820 includes a first control unit 821, which corresponds to the first control unit 21 according to the first embodiment, and the first drive unit 22 (see FIG. 2). The second control device 850 includes a second control unit 851, which corresponds to the second control unit 51 according to the first embodiment, and the second drive unit 52 (see FIG. 2).

The first control unit 821 includes a first setting unit 830, which corresponds to the first setting unit 30 according to the first embodiment, and the first FB unit 40 (see FIG. 2).

The first setting unit 830 includes the first EPS unit 31, a first autonomous unit 832, which corresponds to the first autonomous unit 32 according to the first embodiment, the first fault-time setting unit 33, and the first target setting unit 35.

The first autonomous unit 832 includes a collision avoidance unit 841, a skid prevention unit 842, a parking assistance unit 843, a first autonomous setting unit 844, and a first aggregate setting unit 845, which correspond to the collision avoidance unit 321, the skid prevention unit 322, the parking assistance unit 323, the first autonomous setting unit 324, and the first aggregate setting unit 325, respectively, according to the first embodiment.

The second control unit 851 includes a second setting unit 860, which corresponds to the second setting unit 60 according to the first embodiment, and the second FB unit 70 (see FIG. 2).

The second setting unit 860 includes the second EPS unit 61, a second autonomous unit 862, which corresponds to the second autonomous unit 62 according to the first embodiment, the second fault-time setting unit 63, and the second target setting unit 65.

The second autonomous unit 862 includes a keeping unit 871, a change unit 872, a second autonomous setting unit 874, and a second aggregate setting unit 875, which correspond to the keeping unit 621, the change unit 622, the second autonomous setting unit 624, and the second aggregate setting unit 625, respectively, according to the first embodiment.

In the control unit 810 according to the second embodiment, too, during a communication fault state, the first setting unit 830 of the first control unit 821 cannot receive the target current Id2 output from the second autonomous setting unit 874 of the second control unit 851, and the second setting unit 860 of the second control unit 851 cannot receive the target current Id1 output from the first autonomous setting unit 844 of the first control unit 821. Hence, the first and second setting units 830, 860 each can know that a communication fault has occurred.

The first autonomous unit 832 of the first setting unit 830 may not set the target current Is1 in the event of a communication fault occurring, as in the case of a control unit fault state in which the second control unit 851 is not working properly. Also, the second autonomous unit 862 of the second setting unit 860 may not set the target current Is2 in the event of a communication fault occurring, as in the case of a control unit fault state in which the first control unit 821 is not working properly.

This allows the steering device 86 according the second embodiment to avoid executing the autonomous steering control in the event of a communication fault occurring.

Upon knowing that a communication fault has occurred, at least one of the first and second control units 821, 851 may notify the vehicle control device 5 of the occurrence of the communication fault. In response to receiving information indicating that the communication fault has occurred, the vehicle control device 5 may inform the driver that the autonomous steering control cannot be executed.

Third Embodiment

Figure 8:
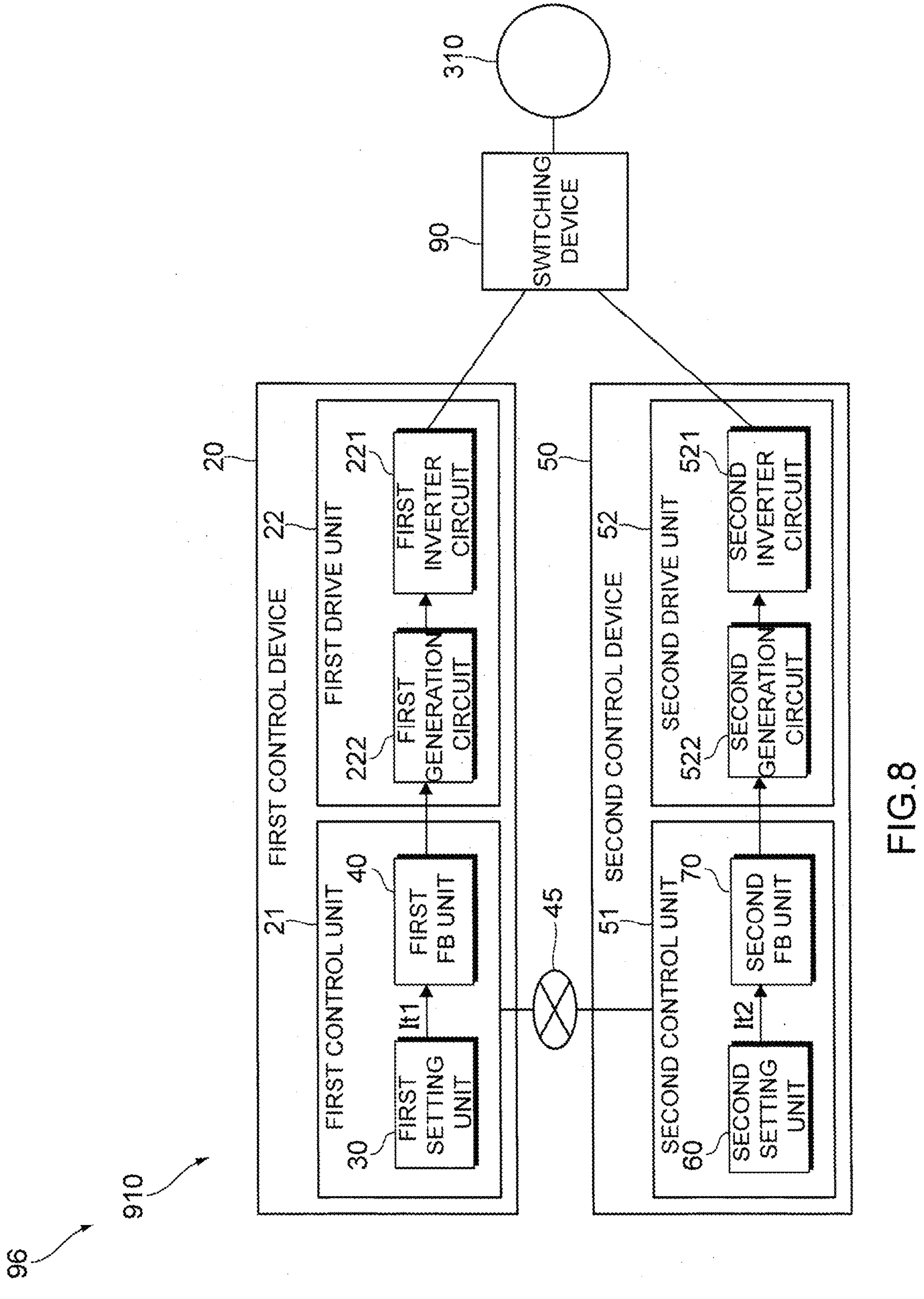
FIG. 8 shows an example of a schematic configuration of a control unit according to a third embodiment.

FIG. 8 illustrates an example of a schematic configuration of a control unit 910 according to a third embodiment.

Figure 9:
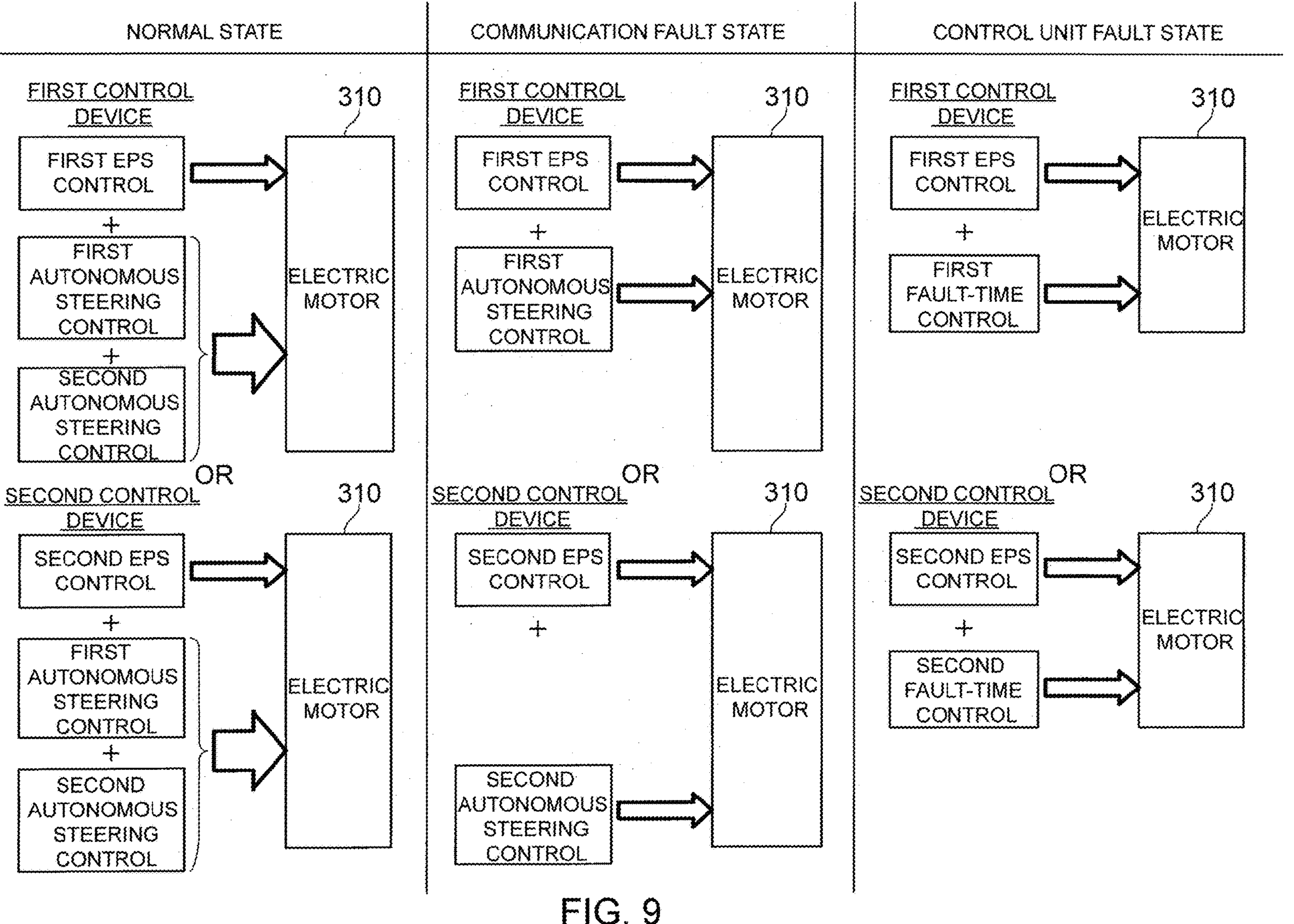
FIG. 9 explains operations of a steering device according to the third embodiment.

FIG. 9 illustrates operations of a steering device 96 according to the third embodiment.

Distinctions of the steering device 96 according to the third embodiment from the steering device 6 according to the first embodiment relate to an electric motor 310 and a control unit 910, which correspond to the electric motor 110 and the control unit 10, respectively. The following discusses the distinctions from the steering device 6 according to the first embodiment, and components with similar functions to those of the steering device 6 according to the first embodiment are identified with the same reference numerals and detailed descriptions thereof are omitted.

In a distinction from the electric motor 110 according to the first embodiment, the electric motor 310 is a three-phase motor with a single winding set (not shown).

The control unit 910 includes the first control device 20, the second control device 50, and a switching device 90 to switch between the first control device 20 and the second control device 50 as a control device to control the current flowing in the winding set of the electric motor 310.

During a normal state and during a communication fault state, the switching device 90 causes one of the first and second control devices 20, 50 to control the current flowing in the winding set of the electric motor 310, and in response to the one of the control devices being in a control unit fault state, the switching device 90 performs a switchover to cause the other of the control devices to control the current flowing in the winding set of the electric motor 310. By way of example, the switching device 90 performs the switchover based on a signal output from the other of the control devices or the vehicle control device 5.

For example, the switching device 90 causes the first control device 20 to control the current flowing in the winding set of the electric motor 310 during a normal state and during a communication fault state, and in response to the first control unit 21 being in a control unit fault state, performs a switchover to cause the second control device 50 to control the current flowing in the winding set of the electric motor 310. The switching device 90 may perform the switchover based on a signal output from the second control unit 51 or the vehicle control device 5.

As with the control unit 10 according to the first embodiment, the above configuration of the control unit 910 allows devices with less performance and storage space than the first and second control devices 520, 550 according to the comparative example to be used as the first and second control devices 20, 50, reducing the product cost. When, alternatively, devices with comparable performance and storage space to the first and second control devices 520, 550 according to the comparative example are used as the first and second control devices 20, 50, the control unit 910 as a whole can have more functions used for autonomous steering. This allows for an efficient use of valuable resources.

Fourth Embodiment

Figure 10:
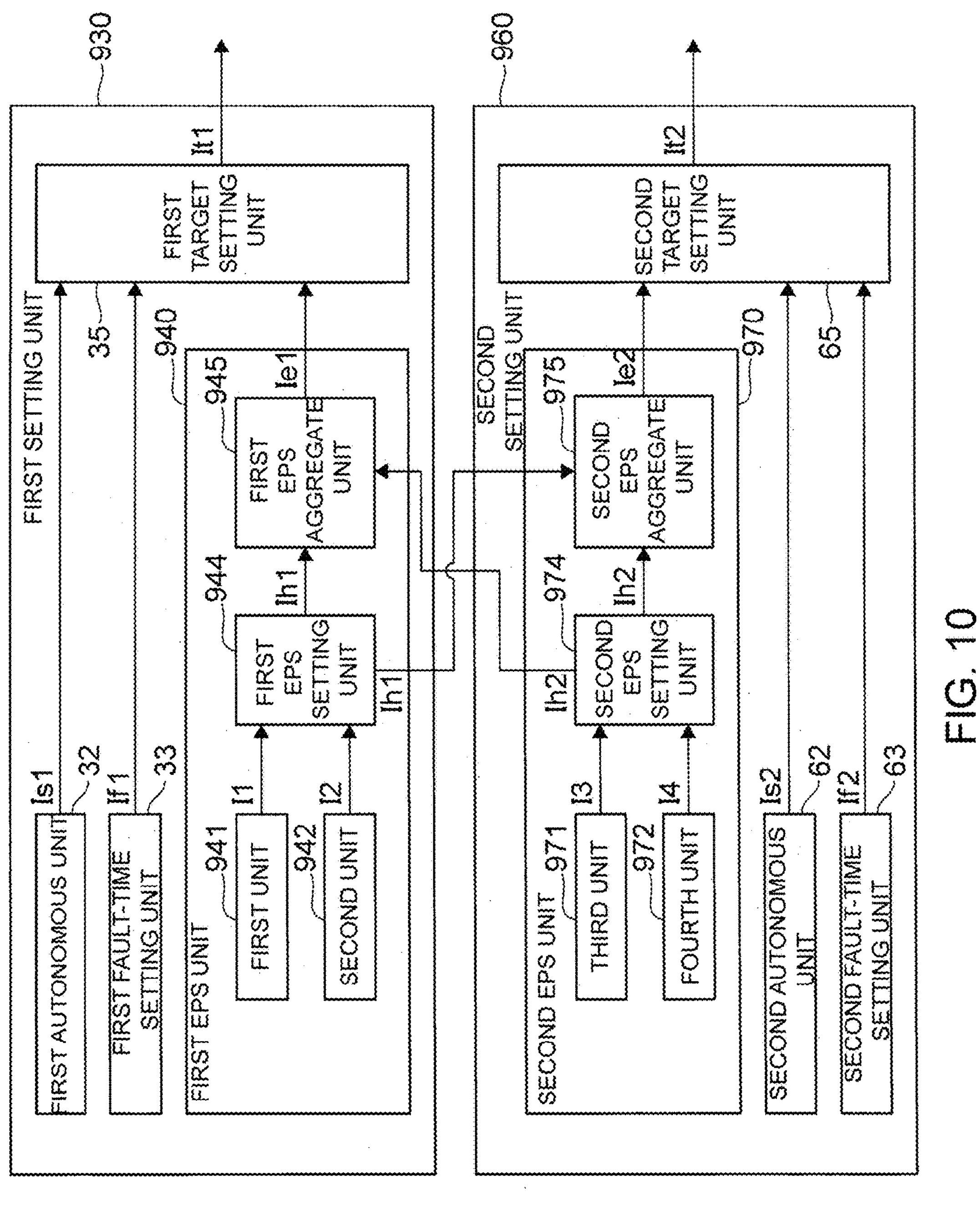
FIG. 10 shows an example of a schematic configuration of a control unit according to a fourth embodiment.

FIG. 10 illustrates an example of a schematic configuration of a control unit 410 according to a fourth embodiment.

Distinctions of a steering device 46 according to the fourth embodiment from the steering device 6 according to the first embodiment, the steering device 86 according to the second embodiment, and the steering device 96 according to the third embodiment relate to a first setting unit 930 and a second setting unit 960, which correspond to the first setting unit 30 and the second setting unit 60, respectively. The following discusses the distinctions from the steering device 6 according to the first embodiment, and components with similar functions to those of the steering device 6 according to the first embodiment are identified with the same reference numerals and detailed descriptions thereof are omitted.

A distinction of the first setting unit 930 from the first setting unit 30 relates to a first EPS unit 940, which corresponds to the first EPS unit 31. A distinction of the second setting unit 960 from the second setting unit 60 relates to a second EPS unit 970, which corresponds to the second EPS unit 61.

The steering device 46 according to the fourth embodiment is characterized in that the EPS control-related functions are distributed between the first EPS unit 940 and the second EPS unit 970, just as the steering device 6 according to the first embodiment implements the autonomous steering control-related functions in a distributed manner.

More specifically, the first EPS unit 940 includes first and second units 941, 942 to set target currents I1, I2 for implementing first and second functions, respectively, which are part of the plural EPS control-related functions. The second EPS unit 970 includes third and fourth units 971, 972 to set target currents I3, I4 for implementing third and fourth functions, respectively, which are part of the plural EPS control-related functions and different from the functions implemented by the first EPS unit 940.

The first EPS unit 940 also includes a first EPS setting unit 944 to output a target current Ih1 (=I1+I2) obtained by adding the target current I1 set by the first unit 941 and the target current I2 set by the second unit 942. The second EPS unit 970 also includes a second EPS setting unit 974 to output a target current Ih2 (=I3+I4) obtained by adding the target current I3 set by the third unit 971 and the target current I4 set by the fourth unit 972.

The first EPS unit 940 also includes a first EPS aggregate unit 945 to output a current obtained by adding the target current Ih1 output from the first EPS setting unit 944 and the target current Ih2 output from the second EPS setting unit 974 as a target current Ie1 (=Ih1+Ih2) set by the first EPS unit 940. The second EPS unit 970 also includes a second EPS aggregate setting unit 975 to output a current obtained by adding the target current Ih2 output from the second EPS setting unit 974 and the target current Ih1 output from the first EPS setting unit 944 as a target current Ie2 (=Ih1+Ih2) set by the second EPS unit 970.

The steering device 46 according to the fourth embodiment configured as described above has the EPS control-related functions distributed between the first EPS unit 940 and the second EPS unit 970. This can reduce the product cost and allows for an efficient utilization of valuable resources.

Although the functions are distributed such that the first EPS unit 940 includes the first and second units 941, 942 and the second EPS unit 970 includes the third and fourth units 971, 972, there is no limitation to how many and which types of functions are to be distributed between the first and second EPS units 940, 970.

REFERENCE SIGNS LIST

1 . . . Steering system
5 . . . Vehicle control device
6, 86, 96 . . . Steering device
10, 810, 910 . . . Control unit
20, 820 . . . First control device
50, 850 . . . Second control device
21, 821 . . . First control unit
51, 851 . . . Second control unit
30, 830 . . . First setting unit
60, 860 . . . Second setting unit
32, 832 . . . First autonomous unit
62, 862 . . . Second autonomous unit

The invention claimed is:

1. A control unit comprising:

a plurality of control devices configured to control drive of an electric motor, wherein the plurality of control devices has general functions used for operating the electric motor both during a normal state and during a fault state, the normal state being where the plurality of control devices is working properly, the fault state being where any one of the plurality of control devices is having a fault, the plurality of control devices has normal-time functions distributed among the plurality of control devices, and the normal-time functions are used during the normal state but unnecessary during the fault state, the normal-time functions being different from the general functions.

2. The control unit according to claim 1, wherein each of the plurality of control devices has fault-time functions used for operating the electric motor during the fault state.

3. The control unit according to claim 1, wherein a first control device of the plurality of control devices is configured to set a first control command value for implementing a first function of the normal-time functions, and a second control device of the plurality of control devices is configured to set a second control command value for implementing a second function of the normal-time functions, the second control device is configured to transmit the set second control command value to the first control device, and the first control device is configured to control drive of the electric motor using the set first control command value and the second control command value received from the second control device.

4. The control unit according to claim 3, wherein the first control device is configured to transmit the set first control command value to the second control device, and the second control device is configured to control drive of the electric motor using the set second control command value and the first control command value received from the first control device.

5. The control unit according to claim 4, wherein one of the first and second control devices is configured not to control drive of the electric motor using the first or second control command value that the one of the first and second control devices transmits, when the other of the first and second control devise is having a fault.

6. The control unit according to claim 1, wherein the normal-time functions comprise functions related to control of autonomous driving or driving assistance of a vehicle equipped with the electric motor.

7. The control unit according to claim 1, wherein the general functions comprise functions to assist in steering a vehicle equipped with the electric motor.

8. A steering device comprising:

an electric motor; and a control unit according to claim 1 configured to control drive of the electric motor.

9. A control unit comprising:

a plurality of control devices configured to control drive of an electric motor, wherein the plurality of control devices includes a first control device and a second control device, the first control device and the second control device have fault-time functions used for operating the electric motor during a fault state where any one of the plurality of control devices is having a fault, the first control device has a first function used during a normal state but unnecessary during the fault state, and the second control device has a second function used during the normal state but unnecessary during the fault state, the second function being different from the first function.

10. The control unit according to claim 9, wherein the first control device is configured to set a first control command value for implementing the first function, the second control device is configured to set a second control command value for implementing the second function, the second control device is configured to transmit the second control command value to the first control device, and the first control device is configured to control drive of the electric motor using the first control command value and the second control command value received from the second control device.

11. The control unit according to claim 10, wherein the first control device is configured to transmit the first control command value to the second control device, and the second control device is configured to control drive of the electric motor using the second control command value and the first control command value received from the first control device.

12. The control unit according to claim 11, wherein one of the first and second control devices is configured to control drive of the electric motor using either the first control command value set by the first control device or the second control command value set by the second control device, when the other of the first and second control devise is having a fault.

13. A steering system comprising:

a vehicle control device configured to control operations of a vehicle; and a steering device configured to receive signals from the vehicle control device and change a traveling direction of the vehicle, wherein the steering device has a plurality of control devices configured to control drive of an electric motor of the steering device, the plurality of control devices including a first control device and a second control device, the first control device and the second control device have fault-time functions used for operating the electric motor during the fault state where any one of the plurality of control devices is having a fault, the first control device has a first function used during a normal state but unnecessary during the fault state, and the second control device has a second function used during a normal state but unnecessary during the fault state, the second function being different from the first function.

* * * * *